United States Patent [19]

St. John

[11] Patent Number: 4,468,321

[45] Date of Patent: Aug. 28, 1984

[54] FILTER DEVICE WITH MAGNETIC FILTER CLAMP

[75] Inventor: Gerald D. St. John, Jackson, Mich.

[73] Assignee: Gelman Sciences Inc., Ann Arbor, Mich.

[21] Appl. No.: 465,899

[22] Filed: Feb. 17, 1983

Related U.S. Application Data

[63] Continuation-in-part of Ser. No. 357,394, Mar. 12, 1982, abandoned.

[51] Int. Cl.$^3$ .................................................. B01D 29/10
[52] U.S. Cl. .............................. 210/232; 55/DIG. 6; 55/490; 210/474; 210/482
[58] Field of Search ............... 210/483, 446, 232, 473, 210/474, 477, 482, 238, 455, 463, 464, 465, 466, 467, 468; 220/230; 206/818; 55/490, DIG. 6, 31; 137/315; 422/101, 104; 428/900

[56] References Cited

U.S. PATENT DOCUMENTS

| | | | |
|---|---|---|---|
| 2,727,650 | 12/1955 | Moynihan et al. | 206/818 |
| 2,784,843 | 3/1957 | Braunlich | 210/446 |
| 2,959,832 | 11/1960 | Baermann | 55/DIG. 6 |
| 3,124,725 | 3/1964 | Leguillon | 55/490 |
| 3,480,145 | 11/1969 | Gladden | 206/818 |
| 3,831,759 | 8/1974 | Gelman et al. | 210/232 |

OTHER PUBLICATIONS

Encyclopedia of Chemical Technology, Third Edition, vol. 5, Kirk–Othmer, John Wiley & Sons, pp. 251–253.

Primary Examiner—Richard V. Fisher
Assistant Examiner—Wanda L. Millard
Attorney, Agent, or Firm—Reising, Ethington, Barnard, Perry & Milton

[57] ABSTRACT

The filter device is for filtering liquids and has a reservoir member for receiving the liquid to be filtered and a spout member for exit of the liquid after it is filtered, the spout member being assembled to the reservoir member with a filter disc therebetween. Each of these members has an annular ceramic magnet, these ceramic magnets being adjacent each other when the members are assembled whereby the magnetic attraction sealingly clamps the filter disc between the members. In accordance with the invention, the annular ceramic magnet of the reservoir member is completely enclosed within a closed annular cavity in the organic plastic of the reservoir member, the annular magnet being of smaller size than the annular cavity; and the annular ceramic magnet of the spout member is completely enclosed within a closed annular cavity in the organic plastic of the spout member, this annular magnet also being of smaller size than the annular cavity in which it is enclosed. Hence, the ceramic magnets are protected by the organic plastic against chipping, cracking, corrosion or like deterioration but because they are of smaller size than the cavities there is room for expansion, without creation of stresses, when the device is heated in an autoclave as is sometimes required.

7 Claims, 5 Drawing Figures

FILTER DEVICE WITH MAGNETIC FILTER CLAMP

CROSS-REFERENCE TO RELATED APPLICATION

This patent application is a continuation-in-part of U.S. patent application Ser. No. 357,394 filed Mar. 12, 1982, now abandoned.

TECHNICAL FIELD

The subject matter of the present invention is an improved filter device of the general type commonly used in chemical or other laboratories for the filtration of liquids and wherein the filter can be readily removed as, for example, in gravimetric analyses where it is desired to qualitatively or quantitatively identify the solids filtered from the liquids.

BACKGROUND ART

U.S. Pat. No. 3,831,759, assigned to the assignee of the present invention, discloses and covers a filter device for filtering liquids comprising a reservoir member for receiving the liquid to be filtered and a spout member for exit of the liquid after it is filtered, these members being assembled with a filter disc therebetween, one of the members being provided with an annular magnet and the other of the members being provided with an annular magnet or an annulus of other ferromagnetic material such that the magnetic attraction sealingly clamps the filter disc between the members during the filtration. The filter devices of this patent are in common use and have provided successful and advantageous particularly in that they enable rapid assembly and disassembly desired for insertion and removal of the filter disc and yet with a good seal between the filter disc and the reservoir and spout members during filtration. A problem, however, has been that the magnetic and ferromagnetic materials are subject to deterioration. Such deterioration can be from corrosion due to contact with acidic or other corrosive liquids or from chipping or cracking where ceramic magnets are used. The latter in particular is a problem in that ceramic magnets, such as of the alkaline metal or alkaline earth metal ferrites, while otherwise being excellent because of their light weight, relatively low cost and high magnetic strength, are disadvantageous by reason of their susceptibility to chipping or cracking.

The present invention is an improvement over that covered by the aforesaid patent, an improvement wherein ceramic magnets are used so as to gain their fullest advantages and yet with the structure of the filtration device being such that the disadvantages are eliminated.

BRIEF DESCRIPTION OF THE INVENTION

In the filtration device of the present invention the reservoir member and the spout member are of organic plastic and each is provided with an annular ceramic magnet thereby to provide at relatively low cost and without excessive weight the high magnetic attraction desired for firm sealed clamping of the filter disc, but with the annular ceramic magnet of the reservoir member being completely enclosed within a closed annular cavity in the organic plastic of the reservoir member, the annular magnet being of smaller size than the annular cavity; and with the ceramic magnet of the spout member being completely enclosed within an annular cavity in the organic plastic of the spout member this annular magnet also being of smaller size than the annular cavity in which it is enclosed. Hence, the ceramic magnets, by reason of their being completely enclosed in the organic plastic, are amply protected against any contact with corrosive liquids and, even more importantly, against chipping or cracking from impact, the organic plastic absorbing any impacts or shocks resulting from use, and to a considerable extent even abuse, of the filtration device. But further, because, each magent is smaller than the cavity in which it is enclosed, there is room for expansion of the organic plastic and/or the ceramic, without the creation of stresses, when the device is heated, for example in an autoclave, as is sometimes necessary particularly for medical laboratory uses of the device.

These and other features and advantages of the invention will appear more clearly from the detailed description thereof which follows.

BEST MODE FOR CARRYING OUT THE INVENTION

Figure 1:
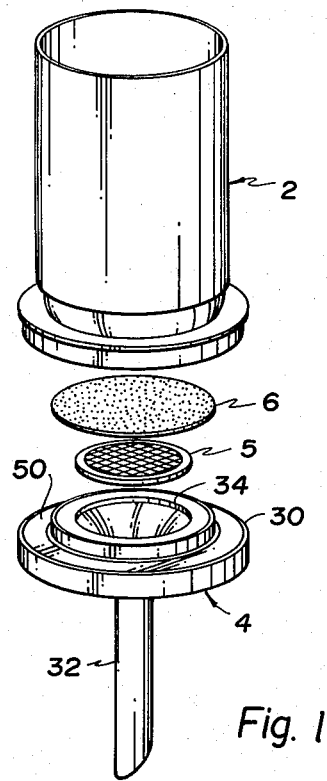
FIG. 1 is an exploded view in perspective of a preferred embodiment of the invention.

Referring now to the drawings, the filter device shown comprises a reservoir member 2, a spout member 4, a support screen 5 and a filter disc 6 which is positioned and clamped between the spout member and the reservoir member when they are assembled.

The reservoir member comprises a molding of an organic plastic, i.e. a solid organic polymeric material, which is preferably transparent or at least translucent and which is preferably of sufficient heat resistance to be heat sterilizable, typically a polysulfone or polycarbonate type thermoplastic resin. The reservoir member is open at the upper end thereof for admission of the liquid to be filtered and has a base portion with a central opening 8 surrounded by a downwardly facing flat annular surface 10 for receiving thereagainst the periphery of the filter disc 6 when the spout member is assembled to the reservoir member with the filter disc therebetween. The base portion of the reservoir member is molded to provide an annular groove between downwardly extending cylindrical flanges 14 and 16, the downwardly facing annular surface 10 being within a cylindrical recess 18 defined by the downwardly extending cylindrical flange 14. An annular ceramic ferrite magnet 20 is positioned in the groove and is sealed therein by a flat annulus 22 of organic plastic, preferably the same as that of the molding, the inner and outer edges of the annulus being sealingly bonded, as by heat bonding, to the lower ends of the flanges 14 and 16 respectively whereby the organic plastic annulus becomes an integral part of the reservoir member such that there is provided a closed annular cavity 12 in which the annular ceramic magnet is completely enclosed. Hence, the magnet is sealed within the organic plastic of the reservoir member.

Figure 5:
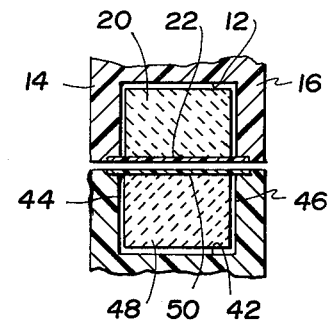
FIG. 5 is a view similar to that of FIG. 2 but with further parts broken away and in still further enlarged scale.
Figure 4:
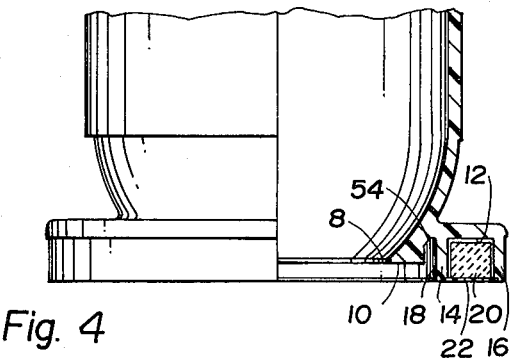
FIG. 4 is a side view in partial section with parts broken away of the reservoir member of the FIG. 1–2 embodiment.

Further in accordance with the invention, and as can best be seen in FIG. 5, the annular ceramic magnet 20 is of smaller size than the cavity 12. That is, the internal diameter of the magnet is greater than the diameter of the inner cylindrical wall of the cavity, the external diameter of the magnet is less than the diameter of the outer cylindrical wall of the cavity, and the height or thickness of the magnet is less than the height of the cavity, whereby there is space between the magnet and each of the cylindrical sides of the cavity and, when the device is assembled and in its normal orientation as shown, a space between the top of the magnet and the top wall of the cavity. This relatively small size of the magnet relative to the size of the cavity, with the spacing thereby provided, is important in that it provides room for expansion of the ceramic magnet and the organic plastic when the device is heated, for example in an autoclave, as is sometimes required particularly for medical laboratory use of the device. The loose fit between the magnet and the cavity enabling room for the relative expansion of the magnet and the organic plastic eliminates need to take into account differences in the thermal expansion of the ceramic magnet and the organic plastic in the selection of the organic plastic and the magnetic ceramic used. In the particular embodiment shown the organic plastic used for the reservoir and spout members has a higher coefficient of thermal expansion than that of the ceramic ferrite magnet, such being of no disadvantage because of the aforesaid feature enabling expansion without the creation of stresses.

In actual practice, in the embodiment illustrated, at normal room temperatures the magnet has a mean diameter of about 2.6 inches and a height of about 0.25 inches and the cavity in which the magnet is enclosed is oversized relative to the magnet only sufficiently to provide a spacing of about 0.025 inches between each side of the magnet and the adjacent side wall of the cavity and a similar spacing between an axial end of the magnet and the adjacent axial end wall of the cavity. It will be understood, of course, that the precise spacings required will depend on size of the device being made, and hence the size of the magnet used, and on the amount of difference between the coefficients of thermal expansion of the magnetic ceramic and the organic plastic used; though in all instances it is best to use spacings somewhat larger than theoretically required since there is no disadvantage in there being some spacing between the magnet and its cavity when the device is at the elevated temperature used in the autoclaving.

The spout member 4 comprises a molding of organic plastic, preferably of the same characteristics as that of the reservoir member, having a head portion 30 with a tube 32 extending downwardly therefrom for exit of the liquid after it is filtered. The head portion has an opening 34 which is of about the same diameter as the opening 8 in the reservoir member and which communicates with the outwardly flared upper portion 36 of the tube 32. The support screen 5 is positioned in the opening 34 and rests on a ledge defined by the periphery of the upper end of the flared tube portion 36. The support screen, which supports the center portion of the filter disc 6, has a grid center portion providing the required openings for flow of the filtered liquid therethrough and a solid periphery, and can be of an organic plastic the same or similar to that of the spout member. It is preferred that the support screen be a separate part removable from the spout member so as to facilitate cleaning after filtration.

The opening 34 is surrounded by an upwardly facing flat annular surface 38 which is on a cylindrical projection 40 of substantially the same diameter as that of the cylindrical recess 18 in the reservoir member. Hence, when the spout member, with its assembled support screen, is assembled to the reservoir member with the filter disc 6 therebetween, the periphery of the filter disc is positioned between and bears against the upwardly facing annular surface 38 of the spout member and the downwardly facing annular surface 10 of the reservoir member.

At the periphery of the head portion of the spout member is an upwardly facing annular groove the sides of which are defined by cylindrical walls 44 and 46, the groove receiving an annular ceramic ferrite magnet 48. A thin flat annulus of organic plastic 50, preferably the same as that of which the spout member molding is formed, is sealingly bonded to the tops of cylindrical walls 44 and 46 whereby the organic plastic annulus becomes an integral part of the spout member such that there is provided a closed annular cavity 42 in which the annular ceramic magnet 48 is completely enclosed. Hence, the magnet 48 is sealed within the organic plastic of the spout member.

Figure 2:
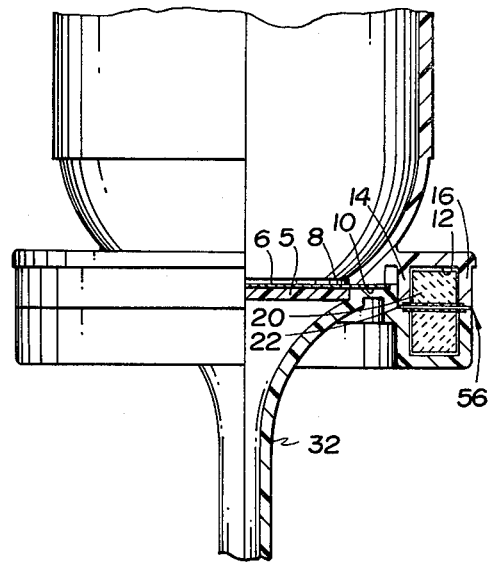
FIG. 2 is a side view in partial section, with parts broken away, and in enlarged scale, of the embodiment shown in FIG. 1 but in its assembled condition.
Figure 3:
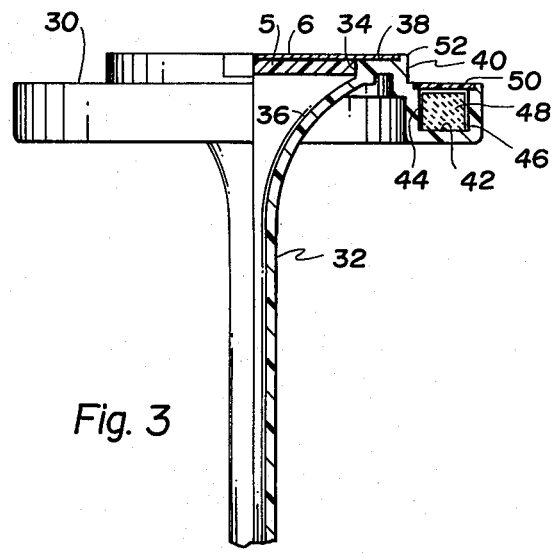
FIG. 3 is a side view in partial section and with parts broken away of the spout member of the FIG. 1–2 embodiment.

Again as can best be seen in FIG. 5, the magnet 48 is of smaller size than the cavity 42 in which the magnet is enclosed, the above description (other than the reference numerals) of this feature relative to magnet 20 and cavity 12 being applicable to the same feature in connection with magnet 48 and cavity 42 of the spout member. When the device is assembled, as shown in FIGS. 2 and 5, the magnet 48 is pulled upwardly by the magnetic attraction against the top wall of the cavity 48 formed by the annulus 50. However, when the spout member is disassembled from the reservoir member, as shown in FIG. 3, it will be seen that the magnet 48 drops so as to abut the lower wall of the cavity 42 leaving a space between the magnet and the upper wall of the cavity.

The loose fit between each magnet and its cavity allows the magnet to move in all directions, laterally and axially, when the device is not assembled, the magnets being held in a fixed position in the cavities when the device is assembled by reason of the magnetic attraction between the magnets. The looseness of the magnets when the device is unassembled serves to no disadvantage; however, if it is desired to eliminate such looseness an annulus of easily compressible resilient foam or the like material can be positioned between the top of the magnet and the top wall of the cavity in the case of the reservoir member, and between the bottom of the magnet and the bottom wall of the cavity in the case of the spout member, or, additionally or alternatively, such foam can be positioned between one or both sides of the magnet and one or the other or both of the side walls of the cavity. However, this adds to cost, requires the use of a foam or the like material having sufficient heat resistance to withstand the autoclave heat and dimensioning of the cavity to accommodate the foam or like material when it is in its compressed state when the device is heated.

The magnet 48 of the spout member is of substantially the same diameter as the magnet 20 of the reservoir member, the magnets being so positioned that when the reservoir and spout members are assembled the upper surface of the magnet 48 and the lower surface of the magnet 20 are adjacent and face towards each other. Each of the magnets is permanently magnetized with one axial end thereof being of one polarity and the other axial end thereof being of the other polarity, and the magnets are so positioned that the upper surface of magnet 48 is of the opposite polarity as the lower surface of magnet 20. (In FIG. 2 this is depicted by showing the upper surface of magnet 48 as being of N polarity and the lower surface of magnet 20 as being S polarity though it will be understood that it could be vice versa.) Hence, when the reservoir and spout members are assembled with the filter disc therebetween, as shown in FIG. 2, the magnetic attraction between the adjacent surfaces of the magnets causes the periphery of the filter disc to be sealingly clamped between the annular surfaces 10 and 38 of the reservoir and spout members respectively.

In the preferred embodiment shown the upwardly facing annular surface 38 is bordered by a thin upwardly extending flange 52 to simplify and assure centering of the filter disc on the surface 38, and the upwardly facing annular surface 10 of the reservoir member is bordered by a downwardly facing annular groove 54 which accommodates the flange 52 when the members are assembled.

It is preferred that the dimensions of the cylindrical flanges 14 and 16 and the walls 44 and 46 and the thicknesses of the flat organic plastic annuli 22 and 50 be such that when the reservoir and spout members are assembled as shown in FIGS. 2 and 5 there is a thin gap 56 between the opposed organic plastic surfaces covering the magnets, thereby assuring that the magnetic attraction between the magnets provides the desired clamping of the periphery of the filter disc between the annular surfaces 10 and 38. A gap 56 of nominally 0.020" is generally ample to assure that the opposed organic plastic surfaces do not bottom against each other when the members are assembled, assuming the organic plastic moldings and magnets are manufactured to dimensions within conventional and accepted manufacturing tolerances. Since the amount of magnetic attraction between the magnets is a function of the distance between their opposed surfaces of opposite polarity, it is best that the thickness of each of the organic plastic annulus 50 not exceed 0.080". In the embodiment shown the thickness of the annulus 22 is 0.040" and likewise the thickness of annulus 50 is 0.040". While the thicknesses of the organic plastic annuli between the opposed surfaces of the magnets somewhat decreases the amount of magnetic attraction per given magnet size, this can be easily compensated for, with very little increase in cost, simply by using somewhat larger magnets, taking into account, however, the requirement that each of the magnets must be loose within its cavity as shown and as has been described.

In the embodiment shown each of the annular cavities 12 and 42 is formed by a groove in the plastic molding with a flat annulus, 22 and 50 respectively, heat bonded and sealed to the plastic molding and forming the closure for the cavity. As a modification which can be useful to simplify manufacture, the ceramic magnet can be enclosed and sealed within a closed hollow thin-walled organic plastic annulus (the interior size of which plastic annulus provides the required spacing between the magnet and the cavity in which it is enclosed as has been described), such assembly of the annular magnet in its enclosing organic plastic hollow annulus then being fitted and bonded into an open ended annular groove in the plastic molding of the spout member or the reservoir member. As another modification, the annular surface 10 of the reservoir member can be of lesser width, i.e. lesser dimension between its inner and outer diameters, or can be shaped with a downwardly convex radius or even an edge (in cross section) so that there is a lesser area of contact between the annular surface 10 and the filter disc thereby to provide more sealing force per unit area of contact under the magnetic attraction of the magnets when the device is assembled. Hence, it will be understood that while the invention has been described and shown with reference to a particular embodiment thereof, these and various other changes and modifications can be made within the full and intended scope of the claims which follow.

What is claimed is:

1. A filter device for filtering liquids comprising: a reservoir member of organic plastic for receiving the liquid to be filtered, said reservoir member having a base portion with an opening therethrough surrounded by a downwardly facing annular surface for receiving thereagainst the periphery of a filter disc; a spout member of organic plastic having a head portion with a tube depending downwardly therefrom for exit of the liquid after it is filtered, said head portion having an opening communicating with the tube and surrounded by an upwardly facing annular surface for receiving thereagainst the periphery of said filter disc; the base portion of said reservoir member having an annular ceramic permanent magnet completely enclosed within a closed annular cavity in the organic plastic of the reservoir member, said annular magnet being smaller than the annular cavity whereby there is spacing between the magnet and the walls of the cavity; and the head portion of said spout member having an annular ceramic permanent magnet completely enclosed within a closed annular cavity in the organic plastic of the spout member, the second-mentioned annular magnet being smaller than said annular cavity in which it is enclosed whereby there is spacing between said second-mentioned annular magnet and the walls of the cavity in which it is enclosed; the annular magnet of the spout member being positioned adjacent the annular magnet of the reservoir member when the spout member is assembled to the reservoir member with the filter disc therebetween whereby the magnetic attraction between the annular magnets causes the periphery of the filter disc to be sealingly clamped between said annular surfaces.

2. A filter device as set forth in claim 1 wherein one of said annular surfaces is in a cylindrical recess in one of said members and the other of said annular surfaces is on a cylindrical projection on the other of said members for removable telescoped fit into said recess when the spout member is assembled to the reservoir member with the filter disc therebetween whereby the magnetic attraction between the annular magnets causes the periphery of the filter disc to be sealingly clamped between said annular surfaces.

3. A filter device as set forth in claim 1 wherein the ceramic magnet of each of said members is received in an annular groove in the member and is covered by an annulus of organic plastic which is bonded to the walls of the groove so as to become an integral part of the member thereby to form the closed annular cavity in the member.

4. A filter device as set forth in claim 3 wherein the magnets are so positioned and the thicknesses of the organic plastic annuli are such that when the reservoir and spout members are assembled with the filter disc therebetween there is a gap between the organic plastic annuli.

5. A filter device as set forth in claim 3 wherein the annulus of organic plastic has a thickness not exceeding 0.080".

6. A filter device as set forth in claim 1 wherein each of the magnets is magnetized such that one axial end thereof is of one polarity and the other axial end thereof is of opposite polarity, the magnets being so positioned that when the members are assembled the axial ends of the magnets adjacent each other are of opposite polarity.

7. A filter device as set forth in claim 1 wherein the opening in the head portion of the spout member has a support screen therein.

* * * * *